E. A. TUTTLE.
Hot Air Register.
No. 1,412. Reissued Feb. 17, 1863.
Fig. 1,
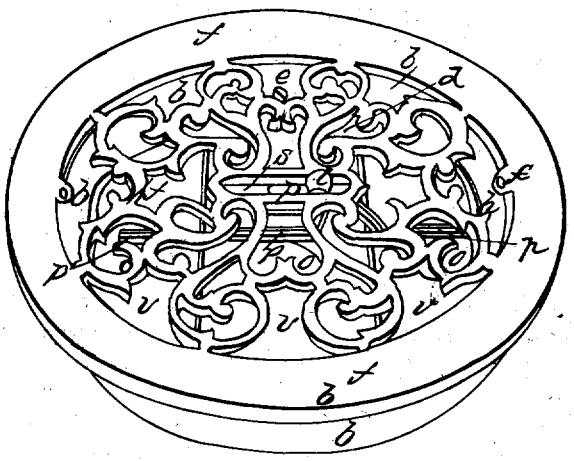
Fig. 2,
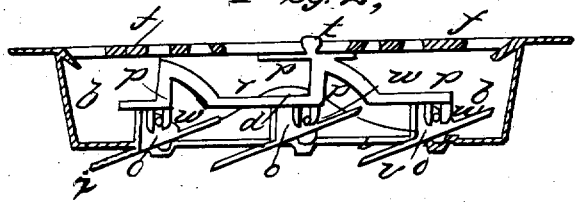
Fig. 3,
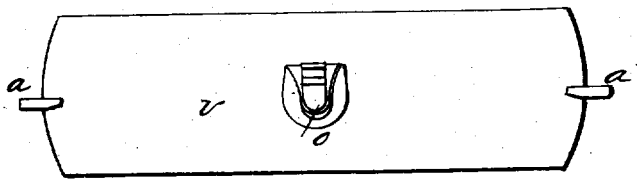
WITNESSES:
Ed A Gallaher,
D Rosebauer
INVENTORS:
B V S. L. Evans
Per John S. Gallaher Jun
for Edward A. Tuttle.
N. PETERS, Photo-Lithographer, Washington, D. C.

UNITED STATES PATENT OFFICE.

EDWARD A. TUTTLE, OF BROOKLYN, NEW YORK.

IMPROVEMENT IN HOT-AIR REGISTERS.

Specification forming part of Letters Patent No. 10,371, dated January 3, 1854; Reissue No. 1,412, dated February 17, 1863.

*To all whom it may concern:*

Be it known that I, EDWARD A. TUTTLE, of Brooklyn, in the county of Kings and State of New York, have invented a new and useful Improvement in Hot-Air Registers and Ventilators; and I hereby declare that the following is a full, clear, and exact description of the same, reference being had to the drawings which accompany and form a part of this specification.

Of these drawings, Figure 1 is a perspective view of the register complete with my improvements. Fig. 2 is a transverse vertical section taken lengthwise through the middle of the rod *p*. Fig. 3 is a representation in detail of one of the fans, with its appendages, the same being shown in a side elevation.

My invention consists of a provision for diminishing the friction and simplifying the construction of the working parts of such registers and ventilators. It constitutes a new and improved arrangement of the rod through which the fans are moved, and also of its connection with the knob or attachment by means of which it is acted upon.

Previous to my improvement the connecting-rod or other instrument employed for transmitting motion to the fans has been so combined with the part in contact with the foot, hand, or other agency used in opening or closing the apparatus that almost the whole force applied presses directly upon the joints and bearings, so as greatly to add to their friction and render it less easy to operate the machinery. Moreover, the construction of these former devices has not been as simple as it is possible to make it, and the fitting of them up has generally required considerable milling, screening, drilling, and riveting, all of which increases their expense without in any way augmenting their utility. I have therefore so arranged my improved register and ventilator that the connecting-rod or medium through which I operate the fans shall at all times rest and ride upon anti-friction bearings formed on the fans themselves in such a manner that the power exerted in operating the apparatus shall not crowd directly against the journals and joints of the working parts, but shall be taken up to a great extent on these anti-friction bearings, which, by reason of their peculiar form, enable the rod to slide easily upon them. The applied power is thus equally distributed, the fans turn naturally on their axes, there is not the usual friction in any portion of the mechanism, especially about the attachment by which it is actuated, and the entire apparatus works freely and smoothly and requires very little power to operate it. In addition, my mode of construction greatly simplifies the machinery, avoids nearly all the fitting up necessary in other arrangements, secures ample strength, and cheapens the whole device.

To make others skilled in the art to make and use my invention, I will describe it in detail.

B is the frame or body of the register or ventilator, formed into any desired shape, round, square, or otherwise. To it, the top or front, made of open-work in the usual manner, is fastened by the screws *c c*, and to the bottom or back side of it the fans *v v v* are suspended, and are secured in their places by any suitable means which will permit them to turn freely on their axes *a*. As shown in the drawings, they are so secured by the end piece, *d*, which is bolted to the frame by the screw *e*. Upon each of the fans is cast what I term a "raised" opening, (represented at *o o o*,) the particular form of which is plainly seen in Fig. 3. These openings are hollow on the under side, as seen in Fig. 2.

The arrangement shown in the drawings for transmitting motion to the fans is a connecting-rod, *v*, which is made in the crooked form represented to allow the fans to open to a right angle with the surface of the open-work. Prongs *p p p* on this rod play into the openings *o o o* on the fans, and over small pins set in the openings, and by this means move the fans to and fro.

If desired, one prong only working in the simple opening *o* may be employed. The connecting-rod is also partly supported in its proper position by the thumb-piece *t*, which slides in the slot *s* in the top of the frame.

A straight bar may be substituted for this slot *s*, and a forked thumb-piece play astride of it. The slide-plate *p* serves to assist in keeping the rod in place, as will be obvious upon inspection of the drawings. A shoulder or pin on the rod at the under side of the top of the frame would answer the same purpose.

Fig. 2 clearly represents the manner in which the fans receive motion when the thumb-piece *t* is actuated.

The rod is cast smooth and dropped into its place. It may be secured there when the top is screwed on.

It is proper to observe that the rod during every part of its movement rides on the face *w* of the bearings *o*, and does not rest upon the pins in the openings, which constitutes an important difference between my improvement and other devices of the same class.

I am aware that connecting-rods formed with slots working over pins on the fans of registers or ventilators are not new, and I do not claim them as my invention; but What I do claim, and desire to secure by Letters Patent, is—

So combining the connecting-rod or arrangement which transmits motion to the fans with the thumb-piece or attachment by which it is actuated, and with the fans themselves, that it shall rest and ride upon anti-friction bearings *o o*, formed on the fans, substantially as above described.

Witnesses: EDWARD A. TUTTLE.
ANDREW I. TODD,
HERWICK DODGE.